(12) United States Patent
Choi

(10) Patent No.: US 7,687,416 B2
(45) Date of Patent: Mar. 30, 2010

(54) ARRANGEMENT FOR FORMING A LAYERED FIBROUS MAT OF VARIED POROSITY

(75) Inventor: Kyung Choi, Louisville, KY (US)

(73) Assignee: AAF-McQuay Inc., Louisville, KY (US)

( * ) Notice: Subject to any disclaimer, the term of this patent is extended or adjusted under 35 U.S.C. 154(b) by 0 days.

(21) Appl. No.: 11/383,061

(22) Filed: May 12, 2006

(65) Prior Publication Data

US 2006/0264141 A1 Nov. 23, 2006

Related U.S. Application Data

(60) Continuation-in-part of application No. 10/438,960, filed on May 15, 2003, now abandoned, which is a division of application No. 09/635,310, filed on Aug. 9, 2000, now Pat. No. 6,596,205.

(51) Int. Cl.
*B32B 27/02* (2006.01)
*B32B 5/26* (2006.01)

(52) U.S. Cl. ............... 442/358; 442/340; 442/348; 442/352; 442/355; 442/360; 442/381; 442/382; 442/400; 442/401

(58) Field of Classification Search ............ 442/358, 442/340, 348, 352, 355, 360, 381, 382, 400, 442/401
See application file for complete search history.

(56) References Cited

U.S. PATENT DOCUMENTS

| | | | |
|---|---|---|---|
| 3,073,005 A | 1/1963 | Tiede | |
| 4,093,437 A | 6/1978 | Ichihara et al. | |
| 4,095,312 A | 6/1978 | Haley | |
| 4,100,324 A | 7/1978 | Anderson et al. | |
| 4,118,531 A | 10/1978 | Hauser | |
| 4,267,002 A | 5/1981 | Sloan et al. | |
| 4,375,446 A | 3/1983 | Fujii et al. | |
| 4,526,733 A | 7/1985 | Lau | |
| 4,702,940 A | 10/1987 | Nakayama et al. | |
| 4,714,647 A | 12/1987 | Ship, Jr. et al. | |
| 4,886,527 A * | 12/1989 | Fottinger et al. | ............... 95/78 |
| 5,306,534 A * | 4/1994 | Bosses | ............. 428/35.2 |
| 5,609,947 A * | 3/1997 | Kamei et al. | ............. 428/212 |
| 5,672,188 A | 9/1997 | Choi | |

(Continued)

FOREIGN PATENT DOCUMENTS

EP 0375234 12/1989

(Continued)

OTHER PUBLICATIONS

Choi; Air Permeability and Pore Distribution of a Dual-Layered Microglass Filter Medium; AFS Society; 1994; pp. 97-99; vol. 8; US.

*Primary Examiner*—Norca L Torres-Velazquez
(74) *Attorney, Agent, or Firm*—James E. Cole; John F. Salazar; Middleton Reutlinger

(57) ABSTRACT

An arrangement for producing a fibrous mat from a heated die source wherein the produced mat includes a first layered, preselected fiber portion of substantially straight fibers produced by directing such fibers directly to a collector source and a second layered preselected fiber portion of substantially curled fibers produced by diverting and exerting an external vortically creative curling force thereon before reaching the collector source.

28 Claims, 4 Drawing Sheets

U.S. PATENT DOCUMENTS

| | | | |
|---|---|---|---|
| 5,721,180 A * | 2/1998 | Pike et al. | 442/346 |
| 5,725,812 A | 3/1998 | Choi | |
| 5,800,586 A | 9/1998 | Cusick et al. | |
| 5,891,482 A | 4/1999 | Choi | |
| 5,908,596 A | 6/1999 | Wilkins et al. | |
| 5,925,281 A | 7/1999 | Tolbert | |
| 5,976,209 A | 11/1999 | Choi | |
| 5,976,427 A | 11/1999 | Choi | |
| 6,169,045 B1 * | 1/2001 | Pike et al. | 442/352 |
| 6,723,669 B1 | 4/2004 | Clark et al. | |

FOREIGN PATENT DOCUMENTS

| | | |
|---|---|---|
| EP | 0404982 B1 | 1/1991 |
| EP | 0822282 A2 | 2/1998 |
| WO | 0243951 A2 | 11/2001 |
| WO | 0198574 A2 | 12/2001 |

* cited by examiner

ARRANGEMENT FOR FORMING A LAYERED FIBROUS MAT OF VARIED POROSITY

CROSS-REFERENCE TO RELATED APPLICATIONS

This is a continuation-in-part of application Ser. No. 10/438,960, filed May 15, 2003, which is a division of application Ser. No. 09/635,310, filed Aug. 9, 2000, now U.S. Pat. No. 6,596,205, each of which are incorporated herein by reference.

BACKGROUND OF THE INVENTION

1. Field of the Invention

The present invention relates to a method, apparatus and product relating to fibrous mat and more particularly to a unique and novel arrangement for making fibrous mat in such a manner that the resulting spun fibrous layered mat has a controlled variable porosity. The present invention has particular applicability to polymer fibrous mat produced by melt blowing die apparatus but it is to be understood that the present invention can be readily utilized in layered mat production wherein fibrous mats of other fibrous materials in addition to preselected polymer material—such as glass—are extracted in die attenuated form from a heated die source unto a spaced collector source.

2. Description of the Related Art

Layered fibrous mat composed of fibers attenuated from a heated die source unto a spaced layered mat collector surface are generally well known in both the glass and melt blown arts but none have utilized the unique and novel arrangement disclosed herein. Although, as above-noted, the present invention is not to be considered as limited to die spinning polymer materials from heated melt blown die sources, the unique and novel arrangement set forth herein has particular applicability in the melt blowing die spinning arrangements as disclosed in the U.S. Pat. No. 5,725,812, issued to Kyung-Ju Choi on Mar. 10, 1998; U.S. Pat. No. 5,891,482, issued to Kyung-Ju Choi on Apr. 6, 1999; U.S. Pat. No. 5,976,209, issued to Kyung-Ju Choi on Nov. 2, 1999; and, U.S. Pat. No. 5,976,427, issued to Kyung-Ju Choi, also on Nov. 2, 1999.

The external treatment of fibers with respect to a fiber collecting source is generally well known in the production of non-woven fabrics, attention being directed to U.S. Pat. No. 4,095,312, issued to D. J. Haley on Jun. 20, 1978 wherein fibers are collected from two fiber feeding sources to a pair of moving collecting surfaces to form a nip; to U.S. Pat. No. 4,100,324, issued to R. A. Anderson, et al. on Jul. 11, 1978, wherein wood pulp fibers are added to a matrix of collected polymeric melt blown micro fibers; to U.S. Pat. No. 4,267,002, issue to C. H. Sloan on May 21, 1981, wherein fibers are formed in elongated rod shape with a heavy build-up in a central portion and a light build-up in a lip portion folded back over the central portion; to U.S. Pat. No. 4,375,466, issued to S. Fujii, et al. on Mar. 1, 1983, wherein melt blown fibers are collected in a valley-like fiber-collecting zone formed by relatively moveable and compressible porous plates which have a controlled number of pores; and, finally to U.S. Pat. No. 4,526,733, issued to J. C. Lau on Jul. 2, 1955, wherein a fluid stream of attenuated fibers is preselectively temperature treated upon exiting die tip orifices to provide improved collected web properties.

Although these above-noted patents disclose various external treatments of fiber streams attenuated from heated die sources, none teaches or suggests, either alone or in combination, the economical and straight-forward arrangement which includes the novel diversion and vertically creating force exertion of a selected portion of fiber streams to provide a selected variable porosity of the total fibrous mat as it passes to a fiber collecting source.

The present invention provides a unique and novel die attenuated fiber arrangement including a straight-forward, economical and inventively unified production method, apparatus and final layered fibrous mat product which allows for efficient and economic control of the porosity of a layered fibrous mat product which can have a selected variable density and porosity. Using the layered fibrous mat as a filter media with an upstream side having a portion being of substantially curled fibers with a larger porosity than a downstream side increases the holding capacity of the filter media with minimal increase in pressure drop across the layered fibrous mat. The present invention accomplishes the unique features thereof with a minimum of apparatus parts and method steps in both manufacture and maintenance and, at the same time, allows for ready adjustment to control variable mat density and porosity in selected areas of a produced fibrous mat.

Various other features of the present invention will become obvious to one skilled in the art upon reading the disclosure set forth herein.

SUMMARY OF THE INVENTION

More particularly the present invention provides a unique and novel method, apparatus and product arrangement in the production of die attenuated fibrous mat which can be utilized in any number of commercial environments—one of which is the fluid filtration art, particularly, in the filtration of gases and more particularly in the filtration of air.

Specifically, the present invention provides a method of forming a web of fibrous media comprising: feeding fibers in attenuated multiple fibers sheet form from spaced heated die orifice sources in a feed path toward a spaced longitudinally extending collector source to be layered on the longitudinally extending collector source in successive lower and upper fiber layers; and, exerting an external vortically creating force at a selectively spaced location on at least a portion of the multiple fibers sheet in the feed path of the sheet as that portion and the remaining portion of the multiple fibers sheet approach the collector source with both portions forming on the collector source with the greatest fiber porosity of the formed layers of fibers on the longitudinally extending collector source being along those fibers of that portion of the multiple fibers sheet exposed to the external vertically creating force.

In addition, the present invention provides apparatus for manufacturing a fibrous mat comprising: spaced, heated die orifices source capable of spinning at least one attenuated multiple spaced fibers sheet; a spaced longitudinally extending collector surface adapted to eventually receive the totality of the multiple spaced fibers sheet to form a fibrous mat thereon; and a gap spaced fiber deflection or diverting apparatus positioned externally of the heated die orifices source to deflect or divert and apply a vertically creating deflecting or diverting force to a portion of the multiple spaced fibers sheet and to then combine the loosely bonded, deflected or diverted, responsive portion on the collector source with the remainder of the attenuated multiple fibers spun as at least one multiple spaced fibers sheet from the heated die source.

Further, the present invention provides a mat of fibrous media comprising at least a first portion of selected fiber diameter and at least a second portion also of selected fiber diameter, the first portion being of substantially aligned fibers of a first comparatively lower porosity and higher density spun from a die source directly to a collector source and the second portion being of substantially curled external force treated fibers of a second comparatively higher porosity and lower density than the first portion due to the external vertically creating force treatment before arriving at the same collector source to combine with the first higher density portion of the fibers in forming the fibrous mat. The fibrous mat provides a filter media with increased holding capacity when the upstream side comprises the second portion.

It is to be understood that various changes can be made by one skilled in the art in the several parts and the several steps of the novel method and apparatus disclosed herein and in the novel fibrous mat also disclosed herein without departing from the scope or spirit of the present invention. For example, the spacing and number of dies, the spacing and type of collector surfaces utilized, the location and structure of the fiber vortically creating, force deflection arrangement and the nature of the fibrous material—each, or all, can be modified without departing from the scope or spirit of the present invention.

BRIEF DESCRIPTION OF THE DRAWINGS

Referring to the drawings which schematically disclose one advantageous embodiment of the present invention:

FIG. 4 illustrating a sloping, static, vertically creating deflector capable of feeding fibers from a heated die fiber source unto the gap-spaced collector surface; and, FIG. 5 illustrating still a further static, vertically creating, deflector or diverter arrangement gap-spaced from the collector surface with a chopped fiber feed supply source; and, FIG. 6 represents a further modified schematic illustration, disclosing an endless belt elongated collector surface spaced from a heated die fibers source and having a gap-spaced, vortically creating deflector surface such as is disclosed in FIG. 1.

DETAILED DESCRIPTION

Figure 1:
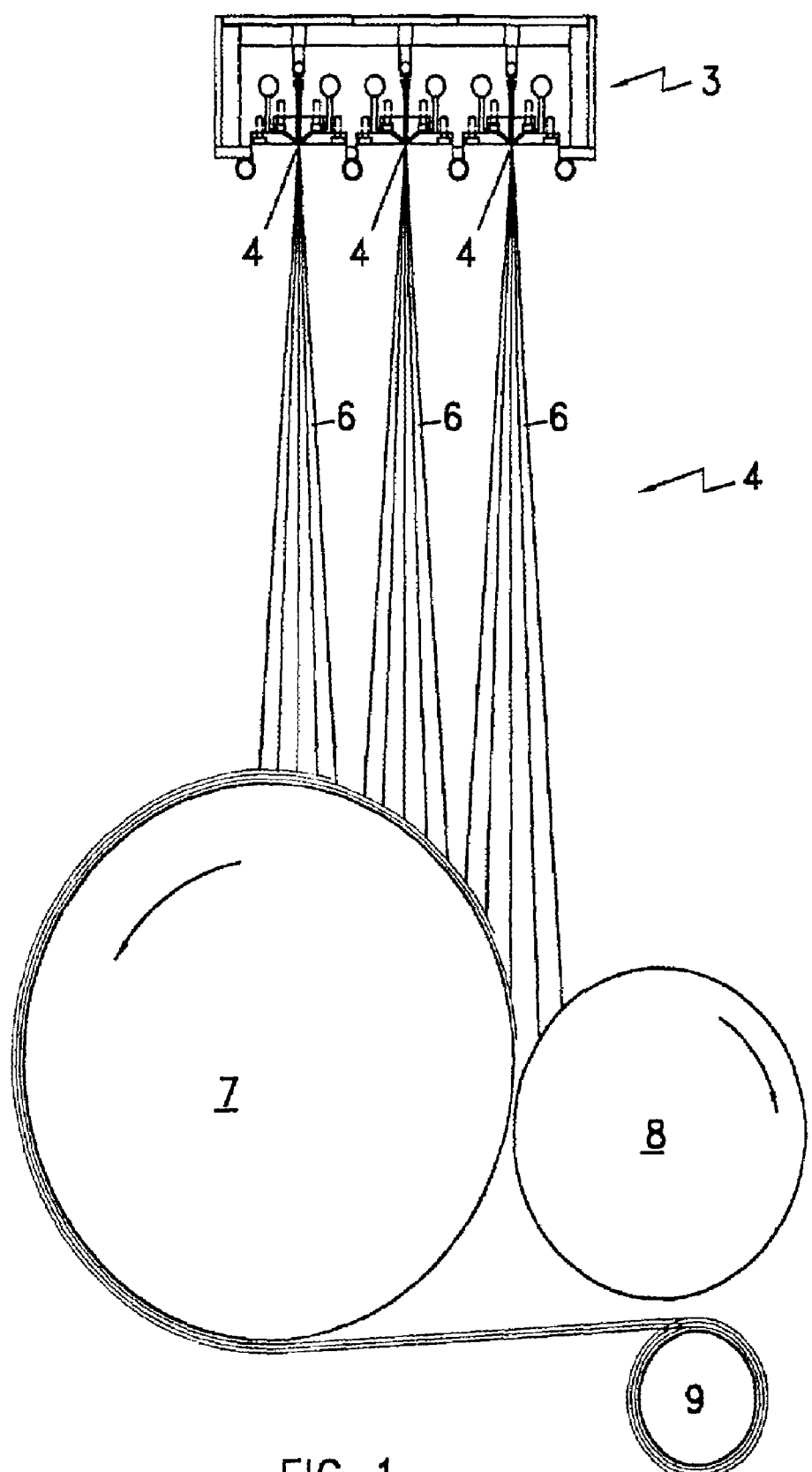
FIG. 1 is a schematic, vertical plan view of one type of heated die source employable in the present invention to attenuate multiple fiber layers to a spaced drum-like collector surface and a drum-like vertically creating force deflector surface gap spaced from the drum-like collector surface and being of smaller diameter than the drum-like collector surface and rotated in an opposite direction to apply a highly turbulent, vortically creating deflecting force to a portion of the multiple fiber layers before such vortically created deflected portion collects with the remainder of the multiple fiber layers which are fed directly to the collector surface.

Referring to FIG. 1 of the drawings, one novel overall embodiment 2 of the present invention is disclosed for forming a layered web of fibrous media in accordance with the unique arrangement as is described hereinafter. This arrangement includes a heated die source 3 having a plurality of spaced die orifices 4 capable of dispensing multiple spaced fibers layers 6 in feed paths toward a spaced longitudinally extending collector source 7. The heated die source 3 can be any one of a number of melt blown die arrangements known in the spaced fiber forming melt blown die art, such as can be found in one or more of the several patents above noted. It is to be understood that the present invention is not to be considered as limited to the melt blown heated die source disclosed herein—which is generally known for dispensing multiple spaced fiber layer 6 of polymer fibrous materials but, that other heated die arrangements such as those utilized to attenuate spaced glass fibers sheets can also be utilized. Advantageously, the die source 3 described herein can dispense polymer spaced fibers mats including several spaced rows of fibers with each row having at least approximately thirty (30) spaced fibers per approximately two point five (2.5) centimeters with each of the fiber diameters being in the range of zero point three (0.3) to twenty-five (25) microns and advantageously being approximately three point five (3.5) microns. A first portion of the multiple spaced fibers 6 are directly attenuated in straight fibers form to a moveable collector source 7, the outer peripheral surface of which is preselectively spaced from heated die source 3 a distance in the range of two point five (2.5) to one hundred (150) centimeters and advantageously a distance of approximately thirty (30) centimeters. A moveable longitudinally collecting surface in the form of a rotatable drum is disclosed in FIG. 1 of the drawing with three (3) spaced multiple fiber layers 6 being attenuated from the heated melt blown die source 3 unto collector source 7. In the drawing disclosed, two of the three spaced multiple spaced fibers 6 are directly attenuated to the rotatable drum collector source 7 in straight fibers form and a portion of the third spaced multiple spaced fiber 6 on the right side of the drawing is directed to a moveable diverting and external force 8. It is to be understood that the fibers from each die row can be comparatively varied in cross-section; i.e., the fibers in one die row being comparatively fine, in an adjacent row comparatively medium, and in still a further adjacent row being comparatively course. Collector source 7 and external vertically creating deflective or diverting force 8 can be in the form of relatively parallel, spaced longitudinally extending rotatable drums 7 and 8, with drum 7 having a larger diameter than vertically creating deflecting or diverting drum 8. Drums 7 and 8 can be rotated in opposite directions by suitable drive and gearing mechanisms (not shown). The peripheral surface of longitudinally extending drum 8 can be gap-spaced from the peripheral surface of larger drum 7 in a spacing range of approximately zero point twenty-five (0.25) to fifteen (15) centimeters and advantageously a spacing of approximately zero point four eight (0.48) centimeters. Accordingly, when a preselected portion of fibers of a multiple fibers mat are diverted to smaller diameter rotating drum 8, rotating in a direction opposite the rotation of drum 7, and at a different speed than drum 8, stress is placed on such diverted fibers. This comparatively small diversion of fibers at different speeds exerts an external, vortically creating, venturi-like force on such spaced fibers causing the same to curl before returning such fibers to collector source rotating drum 7, thus, forming an upper layer of fibers on drum 7 of greater porosity than the directly attenuated fibers from heated die source 3. The total of the multiple fibers mats are then subsequently inverted and moved to a rotatable mat collecting source 9. Mat collecting source 9 can also be in the form of a substantially parallel, longitudinally extending drum rotated at a selected speed determined by the relative diameter size and speed of collector drum 7.

Figure 2:
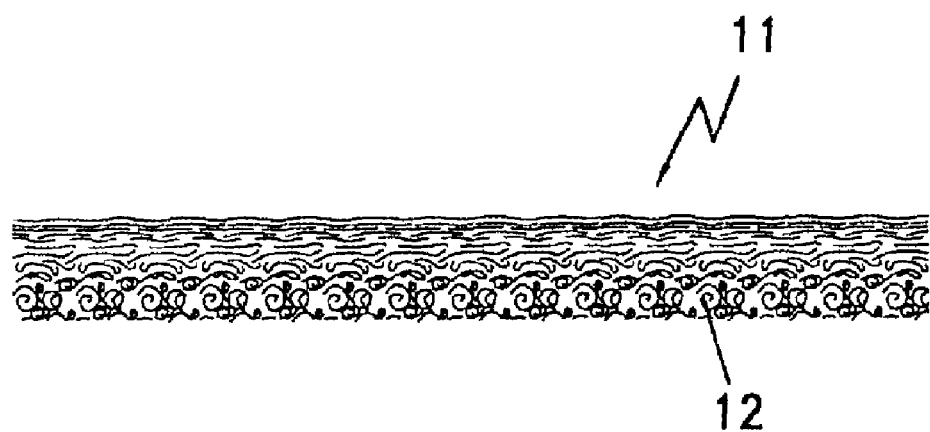
FIG. 2 is a schematic, cross-section of a portion of a novel fibrous mat produced on a novel apparatus such as disclosed in FIG. 1, this figure disclosing the low porosity, high density upper layer portion and the vortically created, curled form lower layer with higher porosity and lower density than the upper layer portion.
Figure 3:
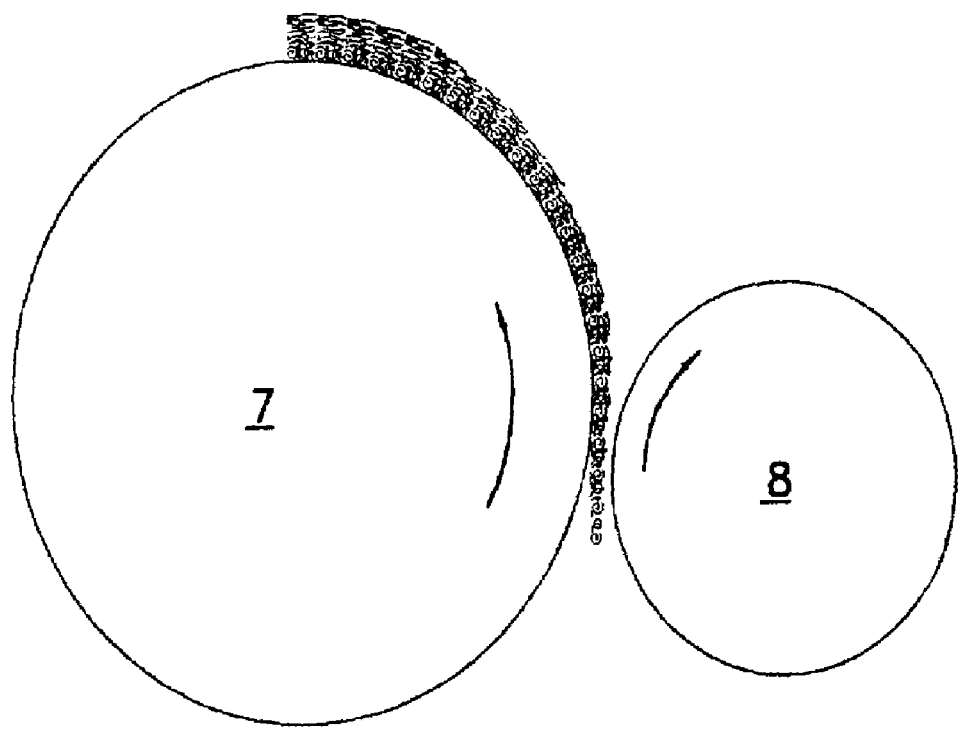
FIGS. 3-5 represent schematic illustrations of a drum-like collector surface with three types of collector surface gap spaced cooperative, vertically creating deflector arrangements FIG. 3 being similar to the novel arrangement of FIG. 1.

Referring to FIG. 2 of the drawings, the schematic cross-section of a portion of a novel fibrous filter mat 11 removed from mat collector source 9 is disclosed. It is to be noted that the lower layers of this mat 11 are of a curled nature 12, having been subjected to the diverting and external vertically creating, venturi-like force in the form of gap-spaced, smaller diameter, longitudinally extending oppositely rotating drum 8 (FIGS. 1 and 3). Preferably, lower layer 12 serves as a portion of an upstream side of a filter media. Advantageously, lower layer 12, as shown, comprises approximately two thirds (⅔) of the total thickness cross-section of filter mat 11, providing a substantial increase in pore volume for holding filtered materials. It is to be understood that the amount of diverted, spaced fibers material and the location thereof in a mat produced in accordance with the features of the present invention can be selectively varied to meet the desired layer parameters established for a particular use thereof Advantageously, lower layer 12 is positioned in an upstream side of a filter media increasing the holding capacity of the filter media.

Figure 4:
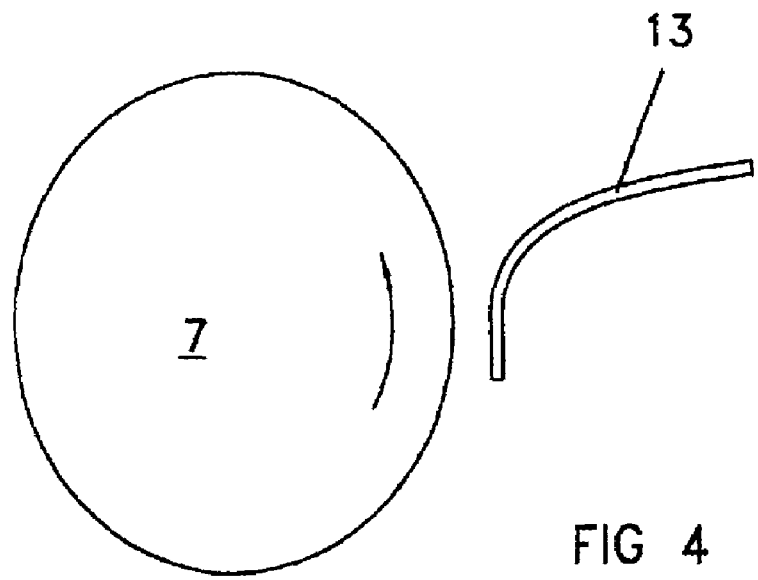
Figure 5:
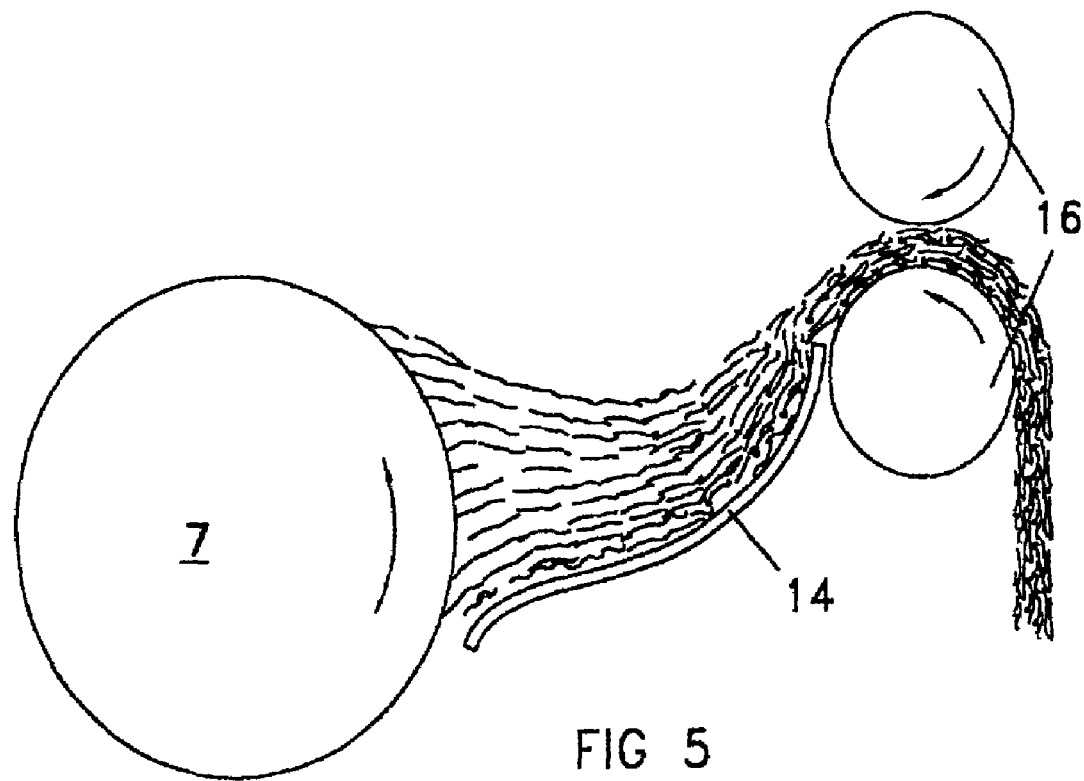

Referring to FIGS. 4 and 5, further inventive modifications of the apparatus of FIGS. 1 and 2 are illustrated. In FIG. 4, the diverting and external force is disclosed in cross-section as a sloping, static vortically creating fibers diverter 13 in gap-spaced cooperation with longitudinally extending, relatively movable collector drum 7; and, in FIG. 5, the diverting and external force is disclosed in cross-section as a sloping static, planar, vertically creating fibers diverter 14 similar to static fibers diverter 13 so as to be in gap-spaced vertically creating cooperation with longitudinally extending collector drum 7. Sloping planar diverter 14 also is shown in FIG. 5 to be in cooperation at an opposite extremity with a further fibers supply feed source 16. It is to be understood that the fibers disposed in supply feed source 16 can be of a chopped or crimp fibers nature and of the same or preselectively different fibrous material.

Figure 6:
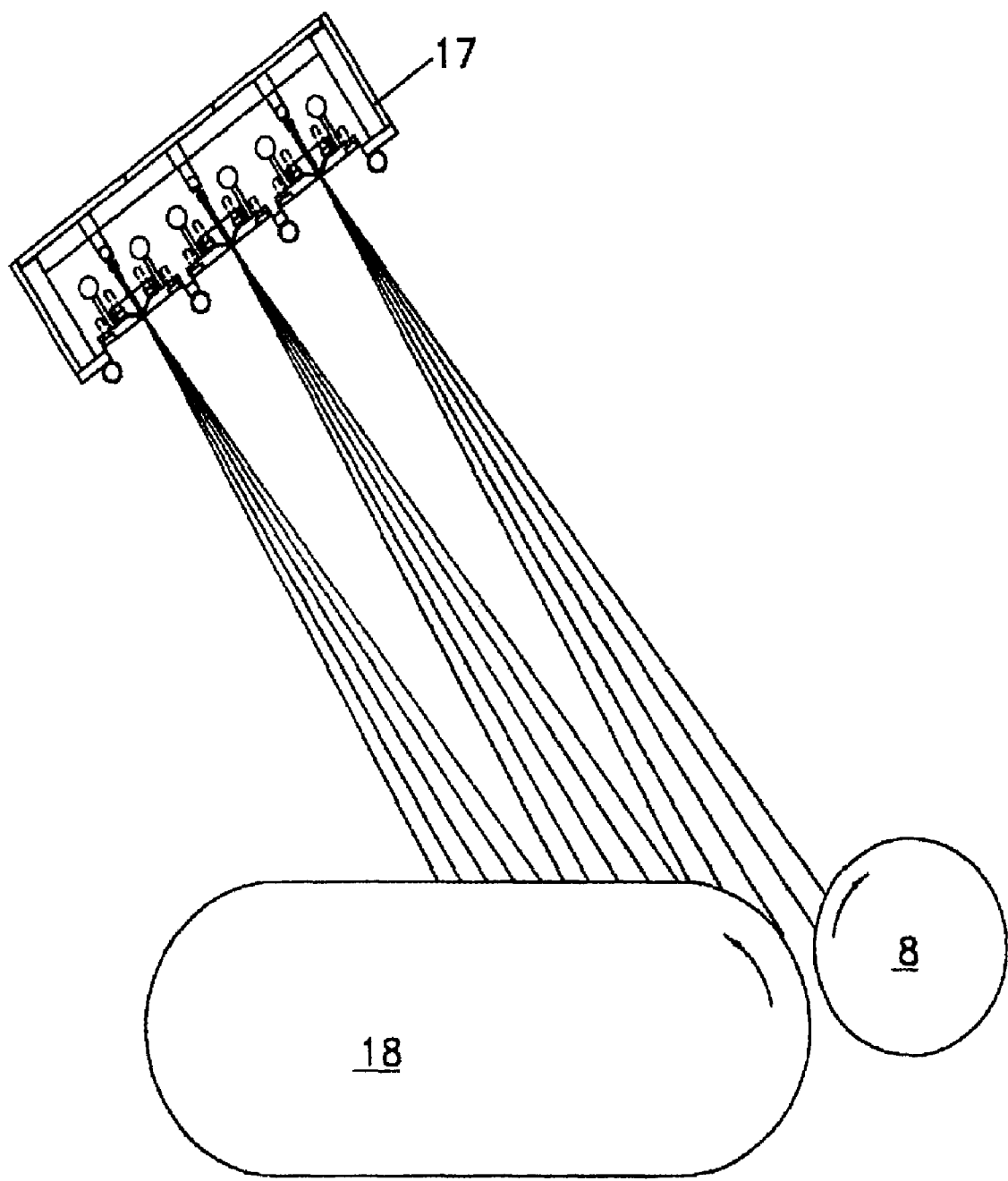

In FIG. 6, still a further embodiment of the present invention is disclosed. In this figure, heated die fibers source 17, similar to that previously described is illustrated as positioned at an inclined angle so as to direct attenuated multiple fibers sheets toward a longitudinally extending moveable endless belt 18 spaced a preselected distance from die source 17. Diverting and external vertically creating force drum 8 of smaller surface than belt 8 and gap-spaced a preselected distance therefrom, moves in an opposite direction from endless belt 8 to exert an external vertically creating force on a preselected portion of the multiple fibers sheet before that portion is returned to endless belt 18 to join the remaining portions of the multiple spaced fibers sheets from furnace 17.

In a typical inventive operation of the aforedescribed inventive apparatus multiple fibers are attenuated from a preselectively spaced heated fibers die source 3 in multiple fibers mats, each layer including spaced rows of spaced fibers of at least thirty (30) fibers per approximately two point five (2.5) centimeters with the fiber diameters advantageously being approximately three point five (3.5) microns. Selectively, a first approximately two thirds plus portion of the total fiber thickness of a formed mat are directed directly toward a first spaced longitudinally extending movable collector source which is spaced from the heated die source 3 approximately thirty (30) centimeters to be directly layered on the longitudinally extending movable collector source. At the same time, a second external vertically creating, venturi-like diverter force is exerted selectively on an approximately the remaining second portion of the fibers from the heated die fibers source, the second vortically creating, venturi-like diverter force, which, if moveable, can be moved at a different speed than drum 7 with the perimeter surface of the diverter creating force being gap-spaced from the peripheral surface of parallel drum 7 approximately zero point four eight (0.48) centimeters to thus curl a two-thirds (⅔) thickness portion of a layered mat of more porous fibers when such fibers are returned to the collector source in the form of rotatable drum 7 and subsequently, invertedly passed to mat collector source 9 with the removed inverted mat 11 (FIG. 2) having the lower two-thirds (⅔) thickness portion of greater porosity than the upper greater density and less porosity portion layers (FIG. 2).

Thus, as can be seen in FIG. 2, a novel fibrous mat of layered form is provided selectively comprising the lower approximately two thirds (⅔) plus thickness portion of porous fibers layers and the remaining, upper portion of less porous and higher density layers, the thickness of the layered fibrous mat with the fibers of both portions being approximately three point five (3.5) microns in average diameter and with the fibers of the one portion having been attenuated directly from a die source to form inverted mat, upper layers of the fibrous mat of lesser porosity than the fibers of the lower layered remaining fibers portion which have been diverted and subjected to an external, vortically creating force to form the lower layers of the inverted mat in curled form with greater porosity than the denser and less porous upper layers.

It is to be understood that the gradient density and the fiber cross-sectional size can be selectively varied by one skilled in the art in accordance with the present invention to meet particular demands of a particulate laden fluid stream to be treated.

I claim:

1. A mat of fibrous filter media comprising a downstream side having at least a first portion of meltblown fibers of selected fiber diameter and an upstream side having at least a second portion of meltblown fibers also of selected fiber diameter, said first portion of meltblown fibers and said second portion of meltblown fibers being continuously intermingled along a planar interface between said first portion and said second portion, said first portion and said second portion being formed of a single material, said first portion being formed of generally straight and substantially aligned fibers of a first selected porosity and said second portion being of substantially curled fibers of a second selected larger porosity than said first portion, at least one of said first and second portion of meltblown fibers having a fiber diameter of between about 0.3 microns and about 25 microns, wherein said mat of fibrous filter media has a fiber size gradient and gradient density and porosity through a depth dimension transverse to said planar interface.

2. The mat of fibrous filter media of claim 1, said fibrous filter media of said first and second portions being melt blown heated die spun.

3. The mat of fibrous filter media of claim 1, said fibrous filter media of said first and second portions being of heated die spun glass.

4. The mat of fibrous filter media of claim 1, said fibrous filter media of said second portion being of chopped fibers.

5. The mat of fibrous filter media of claim 1, said fibers of said first and second portions having diameters in the approximate range of 0.3 to 12 microns.

6. The mat of fibrous filter media of claim 1, said fibers of said first and second portions having an advantageous diameter of approximately 3.5 microns.

7. The mat of fibrous filter media of claim 1, said first portion of said aligned fibers comprised in thickness approximately one-third of said mat and said second portion of said curled external force fibers comprised in thickness approximately two-thirds of said mat.

8. The mat of fibrous filter media of claim 1, said mat being a fluid filter mat.

9. A mat of layered fibrous filter media comprising at least a first downstream portion, a second upstream portion, and a third intermediate portion of continuously intermingled portions of meltblown fibers along a planar interface between a first portion and a second portion, said first, second and third portions being a single material and comprising a fiber size gradient defined by fibers of a first die row being comparatively fine, fibers of a second die row being comparatively medium and fibers of a third die row being comparatively course and with the meltblown fibers of one of said first, second and third portions having been attenuated directly in straight fibers formed from one of said first, second and third die rows to form comparatively denser, less porous layers of said final fibrous mat and the meltblown fibers of another of said first, second and third portions having been diverted and subjected to an external vortically creating force to form at least one layer of said final fibrous mat in curled form with greater porosity than another layer of said final fibrous mat and wherein said mat of fibrous filter media has a gradient density through a depth dimension.

10. A layered web of fibrous filter media comprising:
at least one downstream layer having relatively straight meltblown fibers; and
at least one upstream layer having curled meltblown fibers wherein said upstream layer has a porosity greater than a porosity of said at least one downstream layer having relatively straight fibers;
at least one of said relatively straight meltblown fibers and said curled meltblown fibers having a fiber diameter of between about 0.3 and 25 microns, and said fibrous filter media having a fiber size gradient and a gradient density through a depth;
said at least one upstream layer and said at least one downstream layer being continuously intermingled.

11. The layered web of fibrous filter media in claim 10 wherein said layers have fibers with diameters in a range of approximately 0.3 to 12 microns.

12. The layered web of fibrous filter media in claim 10 wherein said layers have fibers with diameters of approximately 3.5 microns.

13. The layered web of fibrous filter media in claim 10 wherein said upstream layer having curled fibers has fibers with diameters in a range of approximately 0.3 to 12 microns.

14. The layered web of fibrous filter media in claim 10 wherein said upstream layer having curled fibers has fibers with diameters of approximately 3.5 microns.

15. The layered web of fibrous filter media in claim 10 wherein said fibrous filter media is a melt blown synthetic material.

16. The layered web of fibrous filter media in claim 10 wherein said at least one layer having relatively straight fibers has a first and second layer, said second layer being closer in proximity to said upstream layer than said first layer, said first layer being more fine than said second layer.

17. The layered web of fibrous filter media in claim 16 wherein said at least one layer having relatively straight fibers has a third layer, said third layer being closer in proximity to said upstream layer than said second layer, said third layer being more coarse than said second layer.

18. The layered web of fibrous filter media in claim 10 wherein said upstream layer makes up at least approximately ⅔ of the total thickness of said layered web.

19. A mat of fibrous filter media comprising at least a first meltblown fiber portion of selected fiber diameter and at least a second meltblown fiber portion also of selected fiber diameter, said first and second meltblown fiber portions being continuously intermingled along a planar interface between said first and second meltblown portions, said first meltblown fiber portion being a downstream layer of substantially aligned and substantially straight fibers of a first selected porosity spun from a die source directly to a collector source and said meltblown second fiber portion being an upstream layer of substantially curled external vortically creating force treated fibers of a second selected larger porosity than said first portion due to said external vortically creating force treatment before arriving at said collector source to combine with said first portion in forming said continuously intermingled meltblown mat.

20. The mat of fibrous filter media of claim 19, said fibrous filter media of said first and second portions being melt blow heated die spun.

21. The mat of fibrous filter media of claim 19, said fibrous filter media of said first and second portions being of heated die spun glass.

22. The mat of fibrous filter media of claim 19, said fibrous filter media of said second portion being of chopped fibers.

23. The mat of fibrous filter media of claim 19, said fibers of said first and second portions having diameters in the approximate range of 0.3 to 25 microns.

24. The mat of fibrous filter media of claim 19, said fibers of said first and second portions having an advantageous diameter of approximately 3.5 microns.

25. The mat of fibrous filter media of claim 19, said first portion of said aligned fibers comprised in thickness approximately one-third of said mat and said second portion of said curled external force fibers comprised in thickness approximately two-thirds of said mat.

26. The mat of fibrous filter media of claim 19, said mat being a fluid filter mat.

27. The mat of fibrous filter media of claim 19, said mat being a gas filter mat.

28. A mat of layered fibrous filter media comprising at least first and second portions of meltblown continuously intermingled fibers, said first layer being adjacent a downstream side of said mat, said second portion being adjacent an upstream side of said mat, said portions comprising approximately one third and two-thirds respectively of the final thickness of said layered fibrous mat with the meltblown fibers of both portions being approximately 3.5 microns in diameter and with the meltblown fibers of said first portion having been attenuated directly in straight fiber form from a die source to form comparatively denser, less porous layers of said final fibrous mat and the fibers of said second portion having been diverted and subjected to an external vertically creating force to form the layers of said second portion of mat in curled form with greater porosity than said layers of said first portion.

* * * * *